(12) United States Patent
Sakanishi et al.

(10) Patent No.: US 8,133,922 B2
(45) Date of Patent: Mar. 13, 2012

(54) POLYGLYCEROL ALKYL ETHER TYPE NONIONIC SURFACTANT

(75) Inventors: Yuichi Sakanishi, Ohtake (JP); Narumi Muraoka, Ohtake (JP)

(73) Assignee: Daicel Chemical Industries, Ltd., Osaka (JP)

( * ) Notice: Subject to any disclaimer, the term of this patent is extended or adjusted under 35 U.S.C. 154(b) by 373 days.

(21) Appl. No.: 12/372,449

(22) Filed: Feb. 17, 2009

(65) Prior Publication Data

US 2009/0239958 A1   Sep. 24, 2009

(30) Foreign Application Priority Data

Mar. 19, 2008   (JP) ................................ 2008-070901

(51) Int. Cl.
*B01F 17/42* (2006.01)
*C07C 43/11* (2006.01)
(52) U.S. Cl. ............................................. 516/76; 516/9
(58) Field of Classification Search .................... 516/76, 516/9
See application file for complete search history.

(56) References Cited

U.S. PATENT DOCUMENTS

| | | | | |
|---|---|---|---|---|
| 3,865,542 A * | 2/1975 | Kalopissis et al. | ................. | 8/405 |
| 4,298,764 A | 11/1981 | Berkowitz | | |
| 4,465,866 A | 8/1984 | Takaishi et al. | | |
| 5,500,451 A * | 3/1996 | Goldman et al. | ................ | 521/64 |
| 5,708,108 A | 1/1998 | Carey et al. | | |

FOREIGN PATENT DOCUMENTS

| | | | |
|---|---|---|---|
| EP | 1785410 A1 * | 5/2007 | |
| JP | 52-110617 A | 9/1977 | |
| JP | 56-20534 A | 2/1981 | |
| JP | 57-197235 A | 12/1982 | |
| JP | 60-94126 A | 5/1985 | |
| JP | 6-293688 A | 10/1994 | |
| JP | 7-126690 A | 5/1995 | |
| JP | 9-188755 A | 7/1997 | |
| JP | 9-235246 A | 9/1997 | |
| JP | 2005-089494 | 4/2005 | |

OTHER PUBLICATIONS

Sagitani et al. (Solution Properties of Homogeneous Polyglycerol Dodecyl Ether Nonionic Surfactants, JAOCS, vol. 66, No. 1, Jan. 1989, 146-452).*
Advisory Action issued Sep. 2, 2010 in U.S. Appl. No. 11/658,883.
Baskaran et al., "An Efficient and Steroselective Synthesis of (2R,2'S)-1-0-(2'-hydroxyhexadecyl)glycerol and Its Oxo Analogs: Potential Antitumour Compounds from Shark Liver Oil," Tetrahedron Elsevier Science Publishers, Amsterdam, NL, vol. 52, No. 18, Apr. 29, 1996, pp. 6437-6452, XP004104133.
Burgess et al., "Synthesis of Linear 1-0-Dodecylglycerol Ethers Using Allylglycidyl Ether As a Diglycerol Equivalent," Tetrahedron Letters, vol. 33, No. 28, 1992, pp. 4081-4082, XP002572019.
Engler et al., "Grenzflachenaktive Polyhydroxylverbindungen, XXIII, Alkylphenyl-polyglycerinather," Journal F. Prakt. Chemie, vol. 316, No. 2, 1974, pp. 325-36, XP002572018.
Erdlenbruch et al., "Transient and controllable opening of the blood-brain barrier to cytostatic and antibiotic agents by alkylglycerols in rats," Exp. Brain Research, vol. 135, 2000, pp. 417-422, XP002572021.
Office Action issued Jan. 4, 2010 in U.S. Appl. No. 11/658,883.
Office Action issued Jun. 23, 2010 in U.S. Appl. No. 11/658,883.
Office Action issued Mar. 24, 2011 in U.S. Appl. No. 11/658,883.
Office Action issued Oct. 9, 2009 in U.S. Appl. No. 11/658,883.
Sagitani et al., "Solution Properties of Homogeneous Polyglycerol Dodecyl Ether Nonionic Surfactants," JAOCS, vol. 66, No. 1, 1989, pp. 146-152, XP002572020.
Supplementary European Search Report issued on Mar. 24, 2010 in European Application 05780386.8.

* cited by examiner

*Primary Examiner* — Ling Choi
*Assistant Examiner* — Chun-Cheng Wang
(74) *Attorney, Agent, or Firm* — Birch, Stewart, Kolasch & Birch, LLP

(57) ABSTRACT

Disclosed is a polyglycerol alkyl ether nonionic surfactant which is a nonionic surfactant composed of polyglycerol alkyl ethers and has a polyglycerol monoalkyl ether content of 75 percent by weight or more and a polyglycerol dialkyl ether content of 5 percent by weight or less. This nonionic surfactant is an aliphatic nonionic surfactant, is thereby environmentally friendly, has a superior surface activity equivalent to those of aromatic nonionic surfactants, exhibits a superior emulsifying activity stably over time, and is satisfactorily usable in general purposes.

2 Claims, No Drawings

POLYGLYCEROL ALKYL ETHER TYPE NONIONIC SURFACTANT

BACKGROUND OF THE INVENTION

1. Field of the Invention

The present invention relates to polyglycerol alkyl ether nonionic surfactants that exhibit superior emulsifying activities on a variety of oils and solvents; and to nonionic surfactant compositions containing the polyglycerol alkyl ether nonionic surfactants.

2. Description of the Related Art

Aromatic nonionic surfactants prepared via addition polymerization of ethylene oxide (EO) to alkylphenols exhibit very superior emulsifying activities and have thereby been used in a wide variety of fields. However, adverse affects of aromatic nonionic surfactants on the environment and ecosystems have been noticed. The aromatic nonionic surfactants have thereby been more and more replaced with aliphatic nonionic surfactants prepared from aliphatic alcohols as raw materials, in the fields typically of detergents where due consideration must be given to the environment and ecosystems.

As aliphatic nonionic surfactants prepared from aliphatic alcohols, there are known alkylene oxide adducts that are prepared by carrying out addition polymerization of ethylene oxide and an alkylene oxide having three or four carbon atoms to an aliphatic alcohol in the presence of a base catalyst or acid catalyst. The alkylene oxide adducts have already been used typically as detergents, emulsifiers, emulsifiers for emulsion polymerization, dispersants, solubilizers, wetting/swelling agents, and antifoaming agents (see Japanese Unexamined Patent Application Publication (JP-A) No. Hei 7-126690).

However, these nonionic surfactants having polyoxyethylenes or polyoxypropylenes as hydrophilic groups, if used in general consumable articles such as cosmetics and detergents, give emulsions that are not so stable with time and liable to undergo phase separation. This is because the association force between water and a polyoxyethylene chain or a polyoxypropylene chain is weak, whereby the hydrophilicity significantly varies depending on temperature.

To solve the problem of temporal stability of emulsions, a variety of emulsification processes has been investigated. An exemplary process is a process in which the oil/water interfacial tension is minimized by passing through regions where an infinite association of molecules is formed, such as a liquid crystalline phase, a surfactant phase (D phase), and a phase transition temperature (a phase reversal temperature) region, to thereby form fine, homogeneous emulsification particles. These processes are, however, all complicated and thereby suffer from low production efficiency. Specifically, there has been found no aliphatic nonionic surfactant which is an aliphatic nonionic surfactant being environmentally friendly, which has a superior surface activity equivalent to those of aromatic nonionic surfactants, and which can exhibit, via an easy and simple operation, such a superior emulsifying activity stably over time.

SUMMARY OF THE INVENTION

Accordingly, an object of the present invention is to provide an aliphatic nonionic surfactant which is an environmentally-friendly aliphatic nonionic surfactant, which has a superior surface activity (emulsifying activity or solubilizing activity) equivalent to those of aromatic nonionic surfactants, which can exhibit such a superior emulsifying activity stably over time, and which can be satisfactorily used in general purposes.

After intensive investigations to achieve the object, the present inventors have found a nonionic surfactant. This nonionic surfactant contains one or more polyglycerol alkyl ethers, uses a polyglycerol chain as a hydrophilic group instead of polyoxyethylene chains showing hydrophilicity significantly varying with temperature, and uses a branched-chain aliphatic hydrocarbon group as a hydrophobic group. The present inventors have further found that the nonionic surfactant is environmentally friendly, has a superior surface activity equivalent to those of aromatic nonionic surfactants, can be used within a wide range of temperatures, can be used satisfactorily in general purposes, and can exhibit a superior emulsifying activity stably over time via an easy and simple operation. The present invention has been made based on these findings and further investigations.

Specifically, according to an embodiment of the present invention, there is provided a polyglycerol alkyl ether nonionic surfactant which includes one or more polyglycerol alkyl ethers. The nonionic surfactant has a polyglycerol monoalkyl ether content of 75 percent by weight or more and a polyglycerol dialkyl ether content of 5 percent by weight or less.

In a preferred embodiment, the polyglycerol monoalkyl ether is a polyglycerol monoalkyl ether of following Formula (1):

wherein R represents a branched-chain aliphatic hydrocarbon group having from fourteen to twenty-two carbon atoms; and "n" denotes an average number of repeating glycerol units ranging from 2 to 10.

The polyglycerol alkyl ether nonionic surfactant is preferably used as a detergent, an emulsifier, an emulsifier for emulsion polymerization, or a solubilizer.

According to another embodiment of the present invention, there is further provided a nonionic surfactant composition which contains 70 to 95 percent by weight of the polyglycerol alkyl ether nonionic surfactant and 5 to 30 percent by weight of water.

Such polyglycerol alkyl ether nonionic surfactants according to embodiments of the present invention each have a branched-chain aliphatic hydrocarbon group as a hydrophobic group and have a polyglycerol chain whose hydrophilicity hardly varies with temperature. They therefore have superior surface activities equivalent to those of aromatic nonionic surfactants on oils such as mineral oils, vegetable oils, and silicone oils; solvents of various kinds; and synthetic resins of various kinds. They can exhibit such superior surface activities stably over time and can be satisfactorily used in general purposes. They have no aromatic ring, are thereby susceptible to biodegradation by microorganisms, and put less load on the environment.

These and other objects, features, and advantages of the present invention will be understood more fully from the following detailed description of the preferred embodiments. All numbers are herein assumed to be modified by the term "about."

DESCRIPTION OF THE PREFERRED EMBODIMENTS

[Polyglycerol Alkyl Ether]

Polyglycerol alkyl ether nonionic surfactants according to embodiments of the present invention are nonionic surfactants containing one or more polyglycerol alkyl ethers and have a polyglycerol monoalkyl ether content of 75 percent by weight or more and a polyglycerol dialkyl ether content of 5 percent by weight or less. As used herein the term "polyglycerol alkyl ether" means and includes polyglycerol alkyl ethers, polyglycerol alkenyl ethers, and polyglycerol alkynyl ethers.

As used herein the "contents" of respective components, such as polyglycerol monoalkyl ethers and polyglycerol dialkyl ethers, contained in a polyglycerol alkyl ether are determined in the following manner. The respective components are eluted by column chromatography such as high-performance liquid chromatography (HPLC), peaks are detected and areas thereof are measured with a differential refractometer, and area ratios of peaks derived from the respective components relative to the total peak area are determined, and the area ratios are defined as the contents.

Exemplary column chromatography techniques include reversed-phase partition column chromatography which uses, as a carrier, a silica gel having octadecylsilyl group, octylsilyl group, butylsilyl group, trimethylsilyl group, or phenylsilyl group bonded as a functional group; normal phase partition column chromatography which uses, as a carrier, a silica gel having cyanopropyl group or aminopropyl group bonded as a functional group; ion-exchange column chromatography which uses quaternary ammonium group or phenylsulfonic group as a functional group; and adsorption column chromatography which uses a porous silica gel. Among these chromatography techniques, preferred is reversed-phase partition column chromatography which uses, as a carrier, a silica gel having octadecylsilyl (ODS) group. For a higher separating function, the column size herein is preferably 4.6 mm or more in diameter and 250 mm or more in length. A serial arrangement of columns is more preferred for a further higher separative function.

The content of polyglycerol monoalkyl ether in a polyglycerol alkyl ether is 75 percent by weight or more, preferably 80 percent by weight or more, and more preferably 90 percent by weight or more. A polyglycerol alkyl ether nonionic surfactant, if having a polyglycerol monoalkyl ether content of less than 75 percent by weight, may tend to have insufficient solubility in water. Additionally, a larger amount of this polyglycerol alkyl ether nonionic surfactant is required for emulsification, and this tends to cause problems such as environmental pollution and skin roughness (skin disorders). The upper limit of the polyglycerol monoalkyl ether content is 100 percent by weight. The content of polyglycerol dialkyl ether is 5 percent by weight or less, preferably 1 percent by weight or less, and more preferably 0.5 percent by weight or less (e.g., 0 percent by weight or more and 0.5 percent by weight or less). A nonionic surfactant, if having a polyglycerol dialkyl ether content of more than 5 percent by weight, is unlikely to orient or align at the interface and tends to exhibit an insufficient emulsifying activity.

Polyglycerol monoalkyl ethers herein are preferably polyglycerol monoalkyl ethers having a branched-chain aliphatic hydrocarbon group as the "alkyl" moiety, of which polyglycerol monoalkyl ethers of Formula (1) are more preferred. In Formula (1), R represents a branched-chain aliphatic hydrocarbon group having from fourteen to twenty-two carbon atoms; and "n" denotes an average number of repeating glycerol units ranging from 2 to 10.

The repeating unit $C_3H_6O_2$ in the parentheses in Formula (1) may have both structures of following Formulae (2) and (3):

$$—CH_2—CHOH—CH_2O— \quad (2)$$

$$—CH(CH_2OH)CH_2O— \quad (3)$$

In Formula (1), R represents a branched-chain aliphatic hydrocarbon group having from fourteen to twenty-two carbon atoms. Exemplary branched-chain aliphatic hydrocarbon groups include butyloctyl, isomyristyl, isocetyl, hexyldecyl, isostearyl, octyldecyl, octyldodecyl, and isobehenyl groups. Among them, preferred are branched-chain aliphatic hydrocarbon groups having from fourteen to twenty carbon atoms, such as isomyristyl, isocetyl, hexyldecyl, isostearyl, octyldecyl, and octyldodecyl groups, of which more preferred are branched-chain aliphatic hydrocarbon groups having from sixteen to eighteen carbon atoms, such as isocetyl, hexyldecyl, isostearyl, and octyldecyl groups.

The polyglycerol monoalkyl ether may be a single polyglycerol monoalkyl ether or a mixture of different polyglycerol monoalkyl ethers having different groups as R.

A polyglycerol alkyl ether nonionic surfactant according to the present invention may further contain polyglycerols. The content of polyglycerols is, for example, 20 percent by weight or less, and preferably 10 percent by weight or less, based on the total amount of the polyglycerol alkyl ether nonionic surfactant. A polyglycerol alkyl ether nonionic surfactant, if having a polyglycerol content of more than 20 percent by weight, may not be so sufficiently dispersed in water.

[Preparation of Polyglycerol Alkyl Ether]

Polyglycerol alkyl ethers for use herein can be prepared according to various processes. Exemplary preparation processes include (i) a process in which epichlorohydrin is added to an alcohol, dehydrochlorination and ring-closing of the adduct is carried out under a basic condition, the ring is then opened with a diluted sulfuric acid, and these operations are repeated until a target degree of polymerization is obtained; (ii) a process in which glycidol is added to a branched-chain aliphatic alcohol; (iii) glycidol with protected hydroxyl group is added to a branched-chain aliphatic alcohol, and the protecting group is removed; (iv) a process in which glycidol is added to a branched-chain aliphatic alcohol in an apolar solvent such as xylene; (v) a process in which an alkyl sulfate is reacted with a polyhydroxy compound to give a polyhydroxymonoalkyl ether; and (vi) a process in which an alkyl glycidyl ether is reacted with an acetal or ketal of glycerol to give 4-(2'-hydroxy-3'-alkoxy)propoxymethyl-1,3-dioxolane, and this compound is hydrolyzed to give a 2-hydroxy-3-alkoxypropyl glyceryl ether.

The process (ii) of adding glycidol to a branched-chain aliphatic alcohol is preferably used herein. This process can give a high-purity polyglycerol alkyl ether having a higher polyglycerol monoalkyl ether content. The high-purity polyglycerol alkyl ether helps to reduce the amount to be used of a polyglycerol alkyl ether nonionic surfactant containing the polyglycerol alkyl ether to an amount substantially equivalent to that of a polyglycerol alkyl ether nonionic surfactant containing a pure (100%) polyglycerol monoalkyl ether. This avoids problems caused by excessive use of surfactant. Typically, the nonionic surfactant, if used as a detergent, puts less load on the environment. Likewise, the nonionic surfactant, if used in a cosmetic, is unlikely to cause skin roughness.

The process (ii) of adding glycidol to a branched-chain aliphatic alcohol includes the steps of adding a base catalyst to a branched-chain aliphatic alcohol of following Formula (4):

$$R-OH \quad (4)$$

wherein R is as defined above, to convert into an alkoxide; adding glycidol thereto; and carrying out a reaction between them at such a temperature that the mixture can be thoroughly stirred.

Exemplary branched-chain aliphatic alcohols of Formula (4) include branched-chain aliphatic alcohols having from fourteen to twenty-two carbon atoms. Specifically, exemplary branched-chain aliphatic alcohols include butyloctyl alcohol, isomyristyl alcohol, isocetyl alcohol, hexyldecyl alcohol, isostearyl alcohol, octyldecyl alcohol, octyldodecyl alcohol, and isobehenyl alcohol. Among them, preferred are branched-chain aliphatic alcohols having from fourteen to twenty carbon atoms, such as isomyristyl alcohol, isocetyl alcohol, hexyldecyl alcohol, isostearyl alcohol, octyldecyl alcohol, and octyldodecyl alcohol, of which more preferred are branched-chain aliphatic alcohols having from sixteen to eighteen carbon atoms, such as isocetyl alcohol, hexyldecyl alcohol, isostearyl alcohol, and octyldecyl alcohol. Each of different branched-chain aliphatic alcohols may be used alone or in combination.

This process can be carried out, for example, by placing a branched-chain aliphatic alcohol of Formula (4) in a reactor; adding a base catalyst to convert the branched-chain aliphatic alcohol into an alkoxide; and carrying out a reaction while slowly adding glycidol.

The reaction may be conducted at a temperature of from 0° C. to 100° C., preferably from 30° C. to 90° C., and more preferably from 50° C. to 80° C. A reaction, if carried out at a temperature lower than 0° C., may impede the stirring of the composition during the reaction. A reaction, if carried out at a temperature higher than 100° C., may cause self-polymerization of glycidol before it reacts with the alkoxide, and this may cause by-production of polyglycerols.

An inert solvent or a low-boiling compound being unreactive with glycidol may be added in the reaction, so as to prevent the reaction temperature from rising and to reduce the viscosity of the crude reaction mixture. Examples of such compounds or solvents include acetone, ethyl acetate, butyl acetate, hexane, toluene, and xylenes.

The reaction is preferably conducted in an inert gas stream, such as in a nitrogen gas stream, in order to suppress the alkoxide from hydrolysis. Otherwise, polyglycerols are by-produced by the action of a basic compound (alkaline compound), as an initiator, which is formed via the decomposition of the alkoxide. Where necessary, the reaction may be conducted under a pressure (under a load).

In the reaction, a base catalyst (alkaline catalyst; reaction catalyst) is added to the branched-chain aliphatic alcohol before the addition of glycidol. The concentration of the base catalyst is, for example, 4 to 40 percent by mole, and preferably 5 to 30 percent by mole, relative to the branched-chain aliphatic alcohol. A base catalyst, if used in a concentration of less than 4 percent by mole, may induce the self-polymerization of glycidol to give polyglycerols as by-products, before it reacts with the alkoxide, thus being undesirable. In contrast, a base catalyst, if used in a concentration of more than 40 percent by mole, may cause large amounts of reduced products as by-products, thus also being undesirable. The catalyst may be added to the reaction system as a single unit or in installments. It is also accepted that, after the addition of the catalyst, water is distilled out while converting the branched-chain aliphatic alcohol into the alkoxide with heating or with heating under reduced pressure according to necessity.

The base catalyst for use herein is a basic compound and is preferably such a basic compound that the residual basic compound (catalyst) after conversion of the branched-chain aliphatic alcohol into the alkoxide is easily removable. Exemplary basic compounds include, but are not limited to, basic compounds corresponding to protic solvents, except with part of protons being replaced by a cation of alkali metal or alkaline earth metal, such as potassium hydroxide, sodium hydroxide, lithium hydroxide, magnesium hydroxide, calcium hydroxide, sodium methoxide, sodium ethoxide, potassium methoxide, potassium ethoxide, potassium butoxide (butoxypotassium), and sodium butoxide (butoxysodium); basic compounds corresponding to saturated hydrocarbons, except for being partially replaced by a cation of alkali metal or alkaline earth metal, such as butyllithium, methyllithium, and ethyllithium; and basic metals such as sodium metal, potassium metal, and lithium metal. Each of different catalysts may be used alone or in combination.

The reaction leads to addition polymerization of glycidol to the branched-chain aliphatic alcohol to thereby yield a polyglycerol monoalkyl ether of Formula (1).

In the preparation process, a salt derived from the base catalyst can be removed from the resulting compound by carrying out purification after the ring-opening polymerization of glycidol using the base catalyst. The purification can be carried out in the following manner.

Specifically, the purification step can be conducted by neutralizing the base catalyst with an acid to precipitate an alkali metal salt or alkaline earth metal salt, and removing the precipitates through filtration. For carrying out the filtration more easily and simply, a reaction mixture containing the polyglycerol monoalkyl ether and the precipitated alkali metal salt or alkaline earth metal salt may be diluted with a solvent to have a reduced viscosity before filtration, which solvent works as a poor solvent to the salt but as a good solvent to the polyglycerol monoalkyl ether.

The acid compound for use herein is not particularly limited and can be an inorganic acid such as phosphoric acid, sulfuric acid, hydrochloric acid, or nitric acid, or an organic acid such as acetic acid, formic acid, butyric acid, or valeric acid. Among such acids, hydrochloric acid and phosphoric acid are preferred.

Exemplary solvents, if used in the filtration, include alcohols, pentane, hexane, octane, benzene, acetone, ethyl acetate, and diethyl ether. Among them, alcohols are preferred. Exemplary alcohols include, but are not limited to, saturated aliphatic alcohols such as methanol and ethanol; unsaturated aliphatic alcohols; and phenol. They may be linear or branched-chain alcohols or may have a cyclic structure. They may also be polyhydric alcohols such as dihydric alcohols. Although not limitative, alcohols having from one to eight carbon atoms are preferred, of which alcohols having from one to four carbon atoms are more preferred. Each of different alcohols and each of different apolar solvents may be used alone or in combination, respectively.

The amount of solvents is not particularly limited but is preferably such an amount as to allow the resulting solution containing the polyglycerol alkyl ether and the precipitated alkali metal salt or alkaline earth metal salt to have a reduced viscosity to be readily filtrated. Typically, when a filter press that can pressurize at a pressure of 4 kg/cm$^2$ is used as a filtration system, the viscosity of the resulting solution is preferably 30 cps or less.

Conditions for removal of solvents (desolvation) from the filtrated solution containing the polyglycerol monoalkyl ether are not particularly limited, and desolvation can be conducted at any solution temperature and pressure in the system. However, the desolvation is preferably conducted in an inert gas stream and/or under reduced pressure so as to prevent by-products caused typically by oxidation.

The polyglycerol alkyl ether prepared by the process may be further purified according to necessity. Exemplary purification procedures include (a) a deodorization procedure such as deodorization with steam by blowing heated saturated water vapor under reduced pressure, and (b) a decolorization procedure such as bleaching with sodium hypophosphite or hydrogen peroxide.

Nonionic surfactants according to the present invention each contain a polyglycerol alkyl ether. The nonionic surfactants may further contain other components such as water. A polyglycerol alkyl ether nonionic surfactant, if further containing water, may have better appearance and better uniformity. The ratio of the polyglycerol alkyl ether to water (ratio by weight) is, for example, from about 70:30 to about 95:5.

The polyglycerol alkyl ether nonionic surfactants according to the present invention may further contain any of additional components commonly used in regular detergents, within ranges not adversely affecting the objects of the present invention. Exemplary additional components include surfactants that are not irritative (are mild) to the human body, such as sodium polyoxyethylene alkyl ether sulfates each containing an average of 5 to 10 polyoxyethylene units, sucrose fatty acid esters, glycerol fatty acid esters, sorbitan fatty acid esters, propylene glycol fatty acid esters, polyoxyethylene sorbitan fatty acid esters, fatty acid monoethanolamides, polyoxyethylene alkyl ethers, polyoxyethylene alkyl phenyl ethers, as well as carboxybetaine, imidazolinium, sulfobetaine, and alanine amphoteric surfactants; builders such as sodium pyrophosphate, sodium tripolyphosphate, zeolite, sodium citrate, sodium malate, sodium nitrilotriacetate, and sodium polyacrylates; inorganic builders such as sodium carbonate, sodium sulfate, sodium chloride, magnesium sulfate, and calcium chloride; flow improvers such as glycerol, ethanol, propylene glycol, and polyethylene glycols; thickeners such as carboxymethyl cellulose and hydroxyethyl cellulose; flavors; colorants; bactericides or fungicides; enzymes; and anti-inflammatory agents.

The polyglycerol alkyl ether nonionic surfactants according to the present invention have superior surface activities on a variety of oils and solvents, as with alkylphenol nonionic surfactants. They are typically preferably used as emulsifiers for mineral oils, vegetable oils, as well as aliphatic hydrocarbon solvents, alicyclic hydrocarbon solvents, and aromatic solvents. They can also be advantageously used as emulsifiers or dispersants for synthetic resins including silicones, modified silicones, polyolefins, polyesters, and diene polymers such as polybutadienes; and as emulsifiers or solubilizers typically for essential oils and flavors. Additionally, they can be advantageously used as emulsifiers for emulsion polymerization of monomers such as acrylate monomers, styrenic monomers, diene monomers, and vinyl monomers.

The polyglycerol alkyl ether nonionic surfactants according to the present invention can also exhibit very superior performance as detergents, as with alkylphenol nonionic surfactants, and are widely usable in a variety of fields. They are usable typically as industrial and business-oriented detergents; automotive detergents; and chemicals for various industries, such as textile scouring agents, metal surface-treatment agents, metal degreasing agents, detergents for metallic parts, detergents for electronic parts, leather detergents, depitching agents, detergents for linen supplies (laundry detergents), kitchen detergents, fingertip detergents, and dry-cleaning additives. In particular, the polyglycerol alkyl ether nonionic surfactants can exhibit very superior cleaning power typically on mineral oil stains, vegetable oil stains, as well as stains composed typically of inorganic substances, waxes, and resins.

Additionally, the polyglycerol alkyl ether nonionic surfactants according to the present invention maintain their surface activities stably over a long period of time without suffering from phase separation with time. As they each contain 75 percent by weight or more of one or more of polyglycerol monoalkyl ethers, they can be used in a minimized amount. This minimizes the probability of causing problems due to excessive use of such detergents, such as environmental pollution and skin roughness. Further, as containing no aromatic ring, they are susceptible to biodegradation and thereby put less load on the environment.

EXAMPLES

The present invention will be illustrated in further detail with reference to several examples below. It should be noted, however, that these are illustrated only by way of example and are never construed to limit the scope of the present invention. Compounds obtained in these examples were analyzed according to the following techniques.

(1) HPLC Conditions
HPLC main part: Waters 2690 (Waters Corporation)
Column: Wakosil 5C18 (Wako Pure Chemical Industries, Ltd.; a reversed-phase partition column having octadecylsilyl group as a functional group)
Eluent: Methanol/$H_2O$ (=80/20) (by volume)
Flow rate: 0.5 ml/min.
Column oven temperature: 40° C.
Detector type: RI (refractive index) detector
Sample concentration: 10% (solvent: methanol/$H_2O$ (=80/20) (by volume))
Sample amount: 10 μl
Retention times for respective components are 6 minutes for polyglycerols; 10 minutes to 25 minutes for polyglycerol monoalkyl ethers; and 28 minutes to 40 minutes for polyglycerol dialkyl ethers.

(2) $^1$H-NMR Analysis Conditions
NMR system main part: JOEL 270 MHz Nuclear Magnetic Resonance (NMR) Spectrometer
Sample concentration: 1% (wt/wt)
Solvent: Deuterated DMSO (deuterated dimethyl sulfoxide)
Internal standard: TMS (tetramethylsilane)
Polyglycerol monoalkyl ethers and polyglycerols show chemical shifts of 2.8 ppm to 6 ppm.

Preparation Example 1

In a four-neck flask were placed 243.45 g (1.0 mol) of hexyldecyl alcohol and 8.0 g (0.2 mol) of sodium hydroxide. Next, the reaction system was evacuated to 10 mmHg using an aspirator while heating at 100° C. for 90 minutes, so as to remove water from the reaction system. Subsequently, the reaction system was returned to normal atmospheric pressure, and 111.1 g (1.5 mol) of glycidol was added dropwise in a nitrogen stream over 12 hours, while thoroughly stirring the reaction mixture and maintaining the reaction temperature at 70° C. Next, the reaction mixture was neutralized to a pH of 7 with an aqueous phosphoric acid solution, the reaction system was again evacuated with heating to distill off low boiling components, and a neutralized salt was removed by filtration, to give a composition 1 as a reaction mixture.

Compounds in the composition 1 had an average number of repeating glycerol units (n) of about 3.1 as determined by $^1$H-NMR analysis.

The composition 1 was separated into respective components by high-performance liquid chromatography, and peak areas of the components were calculated with an infrared absorption detector to find that the area ratio of polyglycerol(s) to polyglycerol monoalkyl ether(s) was 6.5:93.5, the polyglycerol monoalkyl ether content was 95.1 percent by weight or more, and the polyglycerol dialkyl ether content was 0.5 percent by weight or less (below measurable limits).

Preparation Example 2

In a four-neck flask were placed 270.5 g (1.0 mol) of isostearyl alcohol and 8.0 g (0.2 mol) of sodium hydroxide. Next, the reaction system was evacuated to 10 mmHg using an aspirator while heating at 100° C. for 90 minutes, so as to remove water from the reaction system. Subsequently, the reaction system was returned to normal atmospheric pressure, and 222.2 g (3.0 mol) of glycidol was added dropwise in a nitrogen stream over 12 hours, while thoroughly stirring the reaction mixture and maintaining the reaction temperature at 70° C. Next, the composition was neutralized to a pH of 7 with an aqueous phosphoric acid solution, the reaction system was again evacuated with heating to distill off low boiling components, and a neutralized salt was removed by filtration, to give a composition 2 as a reaction mixture.

Compounds in the composition 2 had an average number of repeating glycerol units (n) of about 4.3 as determined by $^1$-NMR analysis.

The composition 2 was separated into respective components by high-performance liquid chromatography, and peak areas of the components were measured and calculated with an infrared absorption detector to find that the area ratio of polyglycerol(s) to polyglycerol monoalkyl ether(s) was 7.2:92.8, the polyglycerol monoalkyl ether content was 95.1 percent by weight or more, and the polyglycerol dialkyl ether content was 0.5 percent by weight or less (below measurable limits).

Example 1

In a graduated test tube were placed 0.4 g of the composition 1 prepared in Preparation Example 1 (each of samples sampled from immediately after preparation to 28 days after preparation) and 4.0 g of a silicone oil (dimethylpolysiloxane, having a kinematic viscosity of 1000 mm$^2$/s (25° C.)) as an oil to be emulsified, the mixture was stirred on a Touch Mixer for test tubes (Model PM-150 IWAKI Glass Co., Ltd.) for 30 seconds, combined with 5.6 mL of distilled water, further stirred on the Touch Mixer for 1 minute, left stand for 2 hours, the amount (mL) of separated water layer was measured by reading the graduation on the test tube, and an emulsifying activity was calculated according to following Formula (5):

Emulsifying activity (%)=[(Amount of charged water (5.6 mL))−(Amount of separated water layer (mL))]/(Amount of charged water (5.6 mL))×100  (5)

Example 2

Determination of emulsifying activity (%) was conducted by the procedure of Example 1, except for using the composition 2 prepared in Preparation Example 2 instead of the composition 1 prepared in Preparation Example 1.

Comparative Example 1

Determination of emulsifying activity (%) was conducted by the procedure of Example 1, except for using a polyoxyethylene isocetyl ether (trade name "EMALEX 1605", Nihon Emulsion Co., Ltd.) instead of the composition 1 prepared in Preparation Example 1.

Comparative Example 2

Determination of emulsifying activity (%) was conducted by the procedure of Example 1, except for using a polyoxyethylene isostearyl ether (trade name "EMALEX 1805", Nihon Emulsion Co., Ltd.) instead of the composition 1 prepared in Preparation Example 1.

The results obtained in Examples 1 and 2 and Comparative Examples 1 and 2 are summarized in Table 1 below.

TABLE 1

| Days after preparation | Emulsifying activity (%) | | | |
|---|---|---|---|---|
| | Example 1 | Example 2 | Comparative Example 1 | Comparative Example 2 |
| 0 | 100 | 100 | 100 | 100 |
| 1 | 100 | 100 | 49 | 59 |
| 2 | 100 | 100 | 25 | 27 |
| 3 | 98 | 100 | 0 | 0 |
| 6 | 95 | 100 | 0 | 0 |
| 7 | 95 | 100 | 0 | 0 |
| 8 | 95 | 100 | 0 | 0 |
| 9 | 95 | 100 | 0 | 0 |
| 10 | 95 | 100 | 0 | 0 |
| 11 | 95 | 100 | 0 | 0 |
| 14 | 95 | 100 | 0 | 0 |
| 18 | 95 | 100 | 0 | 0 |
| 22 | 11 | 100 | 0 | 0 |
| 28 | 11 | 100 | 0 | 0 |

Example 3

Determination of emulsifying activity (%) was conducted by the procedure of Example 1, except for using 4.0 g of liquid paraffin as the oil to be emulsified.

Example 4

Determination of emulsifying activity (%) was conducted by the procedure of Example 1, except for using 4.0 g of olive oil as the oil to be emulsified.

The results obtained in Examples 3 and 4 are summarized in Table 2 below.

TABLE 2

| Days after preparation | Emulsifying activity (%) | |
|---|---|---|
| | Example 3 | Example 4 |
| 0 | 100 | 100 |
| 1 | 100 | 100 |
| 2 | 100 | 100 |
| 3 | 100 | 100 |

TABLE 2-continued

| Days after preparation | Emulsifying activity (%) | |
|---|---|---|
| | Example 3 | Example 4 |
| 6 | 100 | 100 |
| 7 | 100 | 100 |
| 8 | 100 | 100 |
| 9 | 100 | 100 |
| 10 | 100 | 100 |
| 11 | 100 | 100 |
| 14 | 100 | 100 |
| 18 | 100 | 100 |
| 22 | 100 | 100 |
| 28 | 100 | 100 |

While the above description is of the preferred embodiments of the present invention, it should be appreciated that the invention may be modified, altered, or varied without deviating from the scope and fair meaning of the following claims.

What is claimed is:

1. A nonionic surfactant composition, comprising:
70 to 95 percent by weight of a polyglycerol alkyl ether nonionic surfactant, wherein the polyglycerol monoalkyl ether is a polyglycerol monoalkyl ether of following formula (1):

$$RO-(C_3H_6O_2)_n-H \quad (1)$$

wherein: R represents a branched-chain aliphatic hydrocarbon group having from 14 to 22 carbon atoms; "n" denotes an average number of repeating glycerol units ranging from 2 to 10; and repeating unit $C_3H_6O_2$ in the parentheses have both structures of following formulae (2) and (3):

$$-CH_2-CHOH-CH_2O- \quad (2)$$

$$-CH(CH_2OH)CH_2O- \quad (3); and$$

5 to 30 percent by weight of water,
wherein the polyglycerol alkyl ether nonionic surfactant comprises one or more polyglycerol alkyl ethers, and
wherein the nonionic surfactant has a polyglycerol monoalkyl ether content of 75 percent by weight or more and a polyglycerol dialkyl ether content of 5 percent by weight or less.

2. The nonionic surfactant composition of claim 1, wherein R is selected from the group consisting of isocetyl, hexyldecyl, isostearyl, and octyldecyl groups.

* * * * *